G. H. DAY.
LENS ATTACHMENT.
APPLICATION FILED JUNE 19, 1912.
1,119,811.
Patented Dec. 8, 1914.
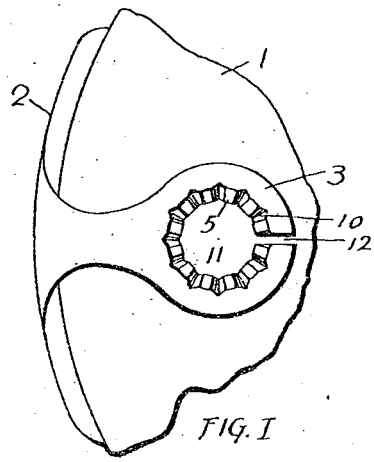
FIG. I.
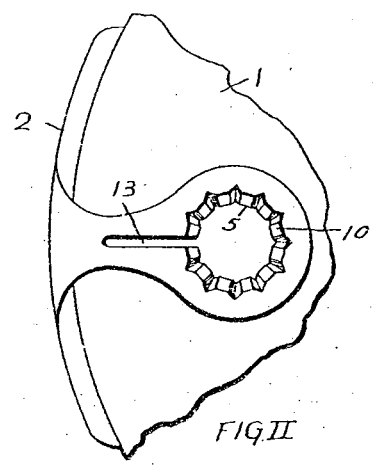
FIG. II.
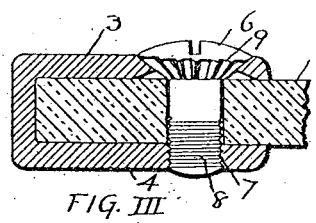
FIG. III.
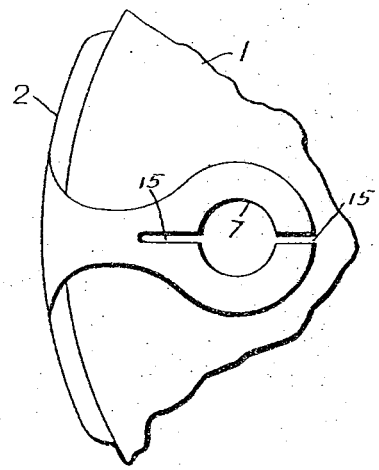
FIG. IV.
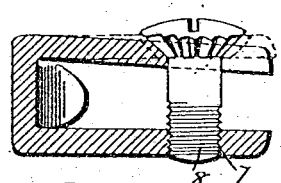
FIG. V.
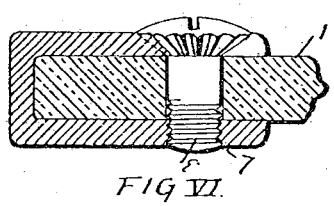
FIG. VI.
WITNESSES:
Joseph J. Demers
Maurice D. Herman
INVENTOR
GEORGE H. DAY
By
H. H. Stytt & H. H. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

LENS ATTACHMENT.

1,119,811.  Specification of Letters Patent.  Patented Dec. 8, 1914.

Application filed June 19, 1912. Serial No. 704,571.

*To all whom it may concern:*

Be it known that I, GEORGE H. DAY, a citizen of the United States, residing at Southbridge, in the county of Worcester and State of Massachusetts, have invented certain new and useful Improvements in Lens Attachments, of which the following is a specification.

My invention relates to improvements in lens attachments, and has particular reference to an improved form of lens attachment and lens screw for use in connection therewith.

The leading object of my invention is the provision of improved means whereby the lens screw will be locked against accidental loosening rotation.

The further object of my invention is the provision in connection with lens screw locking mechanism of an improved construction of lens attachment which will permit of relative yielding of the screw locking parts to facilitate their engagement in tight interlocking relation.

Other objects and advantages of my improved lens attachment should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a plan view of a lens clip ear forming a part of my invention. Fig. II represents a similar view of a slightly modified construction. Fig. III represents a fragmentary sectional view of another modification of my invention. Fig. IV represents a plan view of the tapped ear into which the lens screw fits. Fig. V represents a sectional view illustrating the position of the parts as the screw is being tightened into position, the normal position of the parts being indicated in dotted lines; and Fig. VI illustrates a similar sectional view with the screw in its final locked position.

In the drawings, in which similar characters of reference are employed to denote corresponding parts throughout the several views, the numeral 1 designates an ordinary lens having bearing against the edge thereof the strap portion 2 of the lens attachment, said strap portion having extending inward therefrom over the faces of the lens the upper lens clip ear 3 and the lower lens clip ear 4, the upper ear 3 being preferably formed with a countersunk recess 5 to receive the head 6 of the lens screw, while the lower ear has formed therein the tapped aperture 7 to receive the lower threaded portion 8 of the said lens screw.

In ordinary construction of lens attachments much difficulty is experienced due to loosening of the lens screw and consequently of the lens 1 which is held clamped between the clip ears by the said screws. It is the purpose of my invention to obviate this difficulty, and to this end I form the under side of the head 6 of the lens screw with the ribs or teeth 9 adapted for interlocking engagement with the ribs or teeth 10 which are formed on the face of the countersunk portion 5 of the ear 3. Up to a certain point the lens clip and screw may readily be relatively rotated to force the screw into position. Before the screw is securely locked with the ears tightly clamped against the lens, however, the engagement of the teeth 9 and 10 tends to retard or prevent further tightening of the screw in those cases where I apply my invention to an ordinary lens clip. The reason for this will best be understood by reference to Fig. V, from which it will be seen that as the ribs 9 and 10 are riding past each other there is necessarily a relative movement of the screw head 6 and the adjacent lens clip ear 3, this movement being shown in full lines, while the position of the parts ordinarily when the teeth are interlocked is indicated in Fig. V in dotted lines and in Fig. VI in full lines. It will be at once apparent that this yielding of the ear 3 cannot take place after the same is in normally tight engagement with the lens 1 and that consequently further rotation of the screw to satisfactorily tighten the same will either exert such pressure on the ear 3 as to crush or crack the lens or else the teeth 9 and 10 will become burred or worn off. To obviate this difficulty I have resorted to certain expedients all of a similar general nature and all producing the same general result although slightly differing in appearance.

In Fig. I, I have shown extending outward from the countersink 5 and screw aperture 11 the slot 12, while in Fig. II, I have shown a slot 13 extending inward from the said parts. Either of these slots may be employed as desired, or both may be used in conjunction with each other if preferred, the effect in any instance being that the portions of the clip ear 3 adjacent the countersink 5 and aperture 11 having a certain inherent degree of resiliency will yield outward slightly to relieve the lens of undue pressure while allowing the teeth 9 and 10 to pass each other, the clip springing back into place as the teeth interlock to prevent reverse rotation of the screw.

In Fig. III, I have attained this resiliency by cupping out the under side of the ear 3 adjacent the aperture 11, this cupping out and consequent thinning of the material allowing the central portion of the clip 3 to yield inward without bearing against the lens, while the resiliency of the cup ear will throw the yielding portion upward as soon as the pressure of the teeth against each other in turning is removed.

In Fig. IV, I have employed a still further modification in which I slot the lower ear 4 by the slot 15, this permitting the tapped aperture 7 to spread slightly and allow the entire screw to yield upward somewhat as occasion demands, the natural resiliency of the clip 4 causing the parts to spring together to satisfactorily engage the screw when the necessity for the yielding thereof is passed.

From the foregoing description taken in connection with the accompanying drawings, the construction and operation of my improved lens attaching device should be readily apparent, and it will be seen that I have provided a simple, inexpensive and durable structure which on account of the resilient relative yielding movement of the screw and countersunk portion of the clip will permit of correct tightening of the lens screw without damage to the teeth and will cause the interlocking of the teeth to absolutely prevent accidental reverse rotation of the screw and which will thus entirely fulfil the objects of my invention.

I claim:

1. The combination with a lens, of clip ears in engagement therewith, a lens screw passing through the lens and the clip ears, interlocking members carried by the lens screw and by one of the lens clips for securing the screw against accidental rotation, one of the aforesaid parts being slotted to permit of relative yielding of the interlocking members as the screw is rotated while forcing said members into tight interlocking engagement upon cessation of rotation of the screw.

2. The combination with a lens, of a clip therefor having screw receiving apertures formed therein, a lens screw passing transversely of the lens and clip, one side of said clip having a portion thereof cut away to increase the resiliency thereof, and interlocking parts on the screw and clip forced into locking engagement with each other by the resiliency of said reduced portion of the clip.

3. The combination with a lens clip, including a pair of spaced ears having alined apertures formed therein, of a lens holding member passing through said alined apertures, one of said clip ears having a slot formed therein and extending radially from said aperture whereby said ear may yield relative to the securing means, and interlocking members on one of the clip ears and the holding means held in interlocking relation by the resiliency of the split clip ear.

4. A lens clip, including a pair of spaced clip ears having alined apertures formed therethrough, one of the ears having a portion of the under face thereof adjacent the aperture therein cut away to increase the resiliency of that portion of the clip ear, one of the clip ears having a slot formed therein and extending outwardly from the aperture to increase the resiliency of the clip, a lens securing device passing through the apertures in the clip ears and having a head bearing against one of the clip ears, the said clip ear and head having interlocking portions for holding the securing device against accidental rotation, the resiliency of the clips occasioned by slotting and cutting away portions thereof permitting relative yielding of the interlocking parts as the lens securing device is forced into position.

In testimony whereof I affix my signature in presence of two witnesses.

GEORGE H. DAY.

Witnesses:
  ALICE M. HOAR,
  MAURICE D. HERMAN.